(12) United States Patent
Kim et al.

(10) Patent No.: US 9,996,154 B2
(45) Date of Patent: Jun. 12, 2018

(54) APPARATUS AND METHOD OF CONTROLLING DISPLAY APPARATUS

(71) Applicant: Samsung Electronics Co., Ltd., Suwon-si, Gyeonggi-do (KR)

(72) Inventors: Mi-young Kim, Hwaseong-si (KR); Eun-mi Oh, Seoul (KR); Min-su Hwangbo, Suwon-si (KR); Tae-ho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 14/273,870

(22) Filed: May 9, 2014

(65) Prior Publication Data

US 2014/0333529 A1    Nov. 13, 2014

Related U.S. Application Data

(60) Provisional application No. 61/821,318, filed on May 9, 2013.

(30) Foreign Application Priority Data

Sep. 26, 2013   (KR) ........................ 10-2013-0114687

(51) Int. Cl.
  *G06F 3/01*   (2006.01)
  *G06F 3/0484*   (2013.01)
(52) U.S. Cl.
  CPC .......... *G06F 3/015* (2013.01); *G06F 3/04842* (2013.01)

(58) Field of Classification Search
  CPC ........................................................ G06F 3/01
  See application file for complete search history.

(56) References Cited

U.S. PATENT DOCUMENTS

| | | | |
|---|---|---|---|
| 8,473,045 B2 | 6/2013 | Terada et al. | |
| 2009/0247895 A1* | 10/2009 | Morikawa | A61B 5/04842 600/544 |
| 2010/0004556 A1* | 1/2010 | Adachi | A61B 5/0476 600/544 |
| 2012/0127325 A1* | 5/2012 | Lai | H04N 5/23212 348/207.1 |

FOREIGN PATENT DOCUMENTS

| | | |
|---|---|---|
| JP | 2013-004006 | 1/2013 |
| WO | 2010-004698 | 1/2010 |

* cited by examiner

*Primary Examiner* — Amare Mengistu
*Assistant Examiner* — Shawna Stepp Jones
(74) *Attorney, Agent, or Firm* — Staas & Halsey (57) ABSTRACT

Provided are an apparatus and a method of controlling a display apparatus. The method includes presenting a stimulus to a user by using information regarding a user environment, obtaining, from the user, an electroencephalogram (EEG) signal in response to the stimulus, and controlling the display apparatus based on the EEG signal. By using the apparatus and the method of controlling the display apparatus, an appropriate type of a stimulus may be presented to the user based on the information regarding the user environment. Thus, the user may conveniently operate the display apparatus, and may accurately operate the display apparatus according to an intention of the user.

19 Claims, 7 Drawing Sheets

APPARATUS AND METHOD OF CONTROLLING DISPLAY APPARATUS

CROSS-REFERENCE TO RELATED APPLICATIONS

This application claims the benefit of priority under 35 U.S.C. § 119 from U.S. Provisional Patent Application No. 61/821,318, filed on May 9, 2013, in the U.S. Patent and Trademark Office, and the benefit of priority under 35 U.S.C. § 119 from Korean Patent Application No. 10-2013-0114687, filed on Sep. 26, 2013, in the Korean Intellectual Property Office, the disclosures of which are incorporated herein in their entirety by reference.

BACKGROUND OF THE INVENTION

1. Field of the Invention

One or more embodiments of the present general inventive concept relate to an apparatus and a method of controlling a display apparatus, and more particularly, to an apparatus and a method of controlling a display apparatus by connecting to brain waves of a user.

2. Description of the Related Art

Due to the development of various display apparatuses (such as TVs, cellular phones, personal digital assistants (PDAs)), there are numerous occasions in daily life where a user has to operate a display apparatus. A general method of operating the display apparatus includes transmitting commands by using an input tool such as a button, a switch, or a scroll wheel. In this case, the user operates the input tool with his or her hands.

Figure 1:
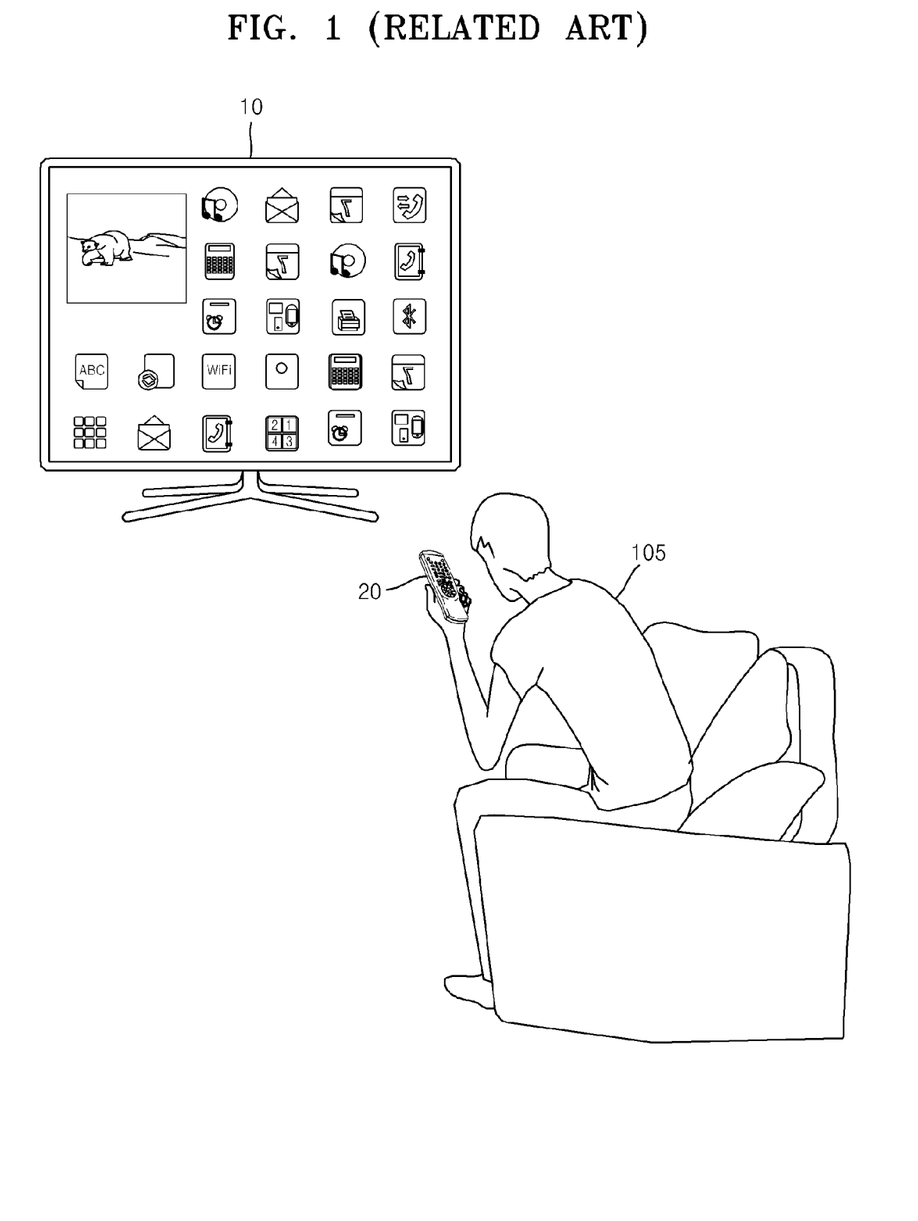
FIG. 1 is a view illustrating a method of controlling a display apparatus according to the related art.

FIG. 1 illustrates a TV 10 as an example of the display apparatus. As illustrated in FIG. 1, a user 105 controls the TV 10 by hand to press a button on a remote control 20. By using the remote control 20, the user 105 may input basic commands for changing channels, adjusting volume, adjusting monitor brightness, or the like, to the TV 10.

However, when the user is using both hands to do housework, baby-sit, drive, and the like, it is difficult to input the commands into the display apparatus by hand.

Also, due to the development of TVs that include various functions, such as a smart TV, the user has to input commands for using the various functions that are provided by the TVs, such as access to the Internet, a social networking service (SNS), or games.

Accordingly, apparatuses and methods of controlling the display apparatuses are becoming multi-functional and highly-advanced.

SUMMARY OF THE INVENTION

A method of controlling the display apparatus by using bio-signals of the user is presented herein to improve a user's experience in controlling the display apparatus. One or more embodiments of the present general inventive concept include an apparatus and a method which allow a user to control a display apparatus conveniently.

One or more embodiments of the present general inventive concept include an apparatus and a method of controlling a display apparatus, in which an appropriate type of a stimulus may be determined according to information regarding a user environment, and then presented to a user. Thus, the user may accurately operate the display apparatus according to an intention of the user, and may feel less tired due to a stimulus for detecting an electroencephalography (EEG) signal.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of controlling a display apparatus, the method includes determining a stimulus to be presented to a user by using information regarding a user environment, presenting the stimulus to the user, obtaining, from the user, an EEG signal in response to the stimulus, and controlling the display apparatus based on the EEG signal.

The information regarding the user environment may include at least one of a distance between the display apparatus and the user, brightness around the display apparatus, and user information.

The determining of the stimulus may include determining to present a stimulus from among stimuli that are recognizable by any one of body senses of the user and determining a stimulus parameter.

The determining of the stimulus may include presenting an auditory stimulus to the user when a distance between the display apparatus and the user is greater than or equal to a predetermined distance and determining a stimulus parameter that includes at least one of a frequency of the auditory stimulus, a sound pressure level of the auditory stimulus, a tone of the auditory stimulus, and a direction of the auditory stimulus that is recognized by the user.

The stimulus may include a visual stimulus. The determining of the stimulus may include determining a stimulus parameter that includes at least one of a display location of the visual stimulus on a screen of the display apparatus, brightness of the visual stimulus, a form of the visual stimulus, a color of the visual stimulus, a duration of the visual stimulus, and a number of times that the visual stimulus is repeated.

The presenting of the stimulus may include displaying at least one selection menu on a screen of the display apparatus and highlighting a selection menu included in the at least one selection menu individually in a random order a predetermined number of times at a predetermined interval.

The highlighting the selection menu may include displaying the selection menu such that brightness of at least one portion of edges of the selection menu, a display location of the selection menu, or a shape or a color of the selection menu is changed.

The controlling of the display apparatus may include selecting and executing a selection menu from among the at least one selection menu based on the EEG signal.

The controlling of the display apparatus may include turning off the display apparatus when the user is determined to be asleep based on the EEG signal.

The presenting of the stimulus may include detecting at least one of a mental state of the user and an eye movement of the user by using the EEG signal obtained from the user and displaying at least one selection menu on a screen of the display apparatus based on at least one of the mental state of the user and the eye movement of the user which are detected.

The presenting of the stimulus may include presenting a visual stimulus related to at least one selection menu that is displayed on the display apparatus. The controlling of the display apparatus may include determining a selection menu to which the user has reacted from among the at least one selection menu by using a plurality of algorithms and selecting and executing a selection menu from among the at least one selection menu based on a determined result.

Exemplary embodiments of the present general inventive concept may also provide a display apparatus including a stimulus determination unit configured to determine a stimulus to be presented to a user by using information regarding a user environment, a stimulus presenting unit configured to present the stimulus to the user, a signal obtaining unit configured to obtain an EEG signal from the user in response to the stimulus, and a controller configured to control a display apparatus based on the EEG signal.

The information regarding the user environment may include at least one of a distance between the display apparatus and the user, brightness around the display apparatus, and user information.

The stimulus determination unit may be further configured to determine a stimulus to be presented from among stimuli that are recognizable by any one of body senses of the user, and may be further configured to determine a stimulus parameter.

When a distance between the display apparatus and the user is greater than or equal to a predetermined distance, the stimulus determination unit may be further configured to present an auditory stimulus to the user. The stimulus determination unit may be further configured to determine a stimulus parameter that includes at least one of a frequency of the auditory stimulus, a sound pressure level of the auditory stimulus, a tone of the auditory stimulus, and a direction of an auditory stimulus that is recognized by the user.

The stimulus may include a visual stimulus. The stimulus determination unit may be further configured to determine a stimulus parameter that includes at least one of a display location of the visual stimulus on a screen of the display apparatus, brightness of the visual stimulus, a form of the visual stimulus, a color of the visual stimulus, a duration of the visual stimulus, and a number of times that the visual stimulus is repeated.

The stimulus presenting unit may be further configured to display at least one selection menu on a screen of the display apparatus, and to highlight a selection menu included in the at least one selection menu individually in a random order a predetermined number of times at a predetermined interval.

The stimulus presenting unit may be further configured to highlight the selection menu such that brightness of at least one portion of edges of the at least one selection menu, a display location of the at least one selection menu, or a shape or a color of the at least one selection menu is changed.

The controller may be further configured to select and execute a selection menu from among the at least one selection menu, based on the EEG signal.

The controller may be further configured to turn off the display apparatus when the user is determined to be asleep based on the EEG signal.

The stimulus presenting unit may be further configured to detect at least one of a mental state of the user and an eye movement of the user by using the EEG signal obtained from the user and to display at least one selection menu on a screen of the display apparatus, based on at least one of the mental state of the user and the eye movement of the user which are detected.

The stimulus presenting unit may be further configured to present a visual stimulus related to at least one selection menu that is displayed on the display apparatus. The controller may be further configured to determine a selection menu to which the user has reacted from among the at least one selection menu by using a plurality of algorithms, and to select and execute a selection menu from among the at least one selection menu based on a determined result.

Exemplary embodiments of the present general inventive concept may also provide a non-transitory computer-readable recording medium having recorded thereon a program, which, when executed by a computer, performs a method controlling a display apparatus, the method including determining a stimulus to be presented to a user by using information regarding a user environment, presenting the stimulus to the user, obtaining, from the user, an EEG signal in response to the stimulus, and controlling the display apparatus based on the EEG signal.

Exemplary embodiments of the present general inventive concept may also provide a method of controlling a display apparatus, including determining a stimulus to be presented to a user, presenting the stimulus to the user in association with at least one selection option, obtaining an electroencephalogram (EEG) signal from the user in response to the stimulus, determining a user selection based on the obtained EEG signal, and controlling the display apparatus in accordance with the determined user selection.

The method may include determining a stimulus by receiving an input selection of a stimulus type or stimulus parameter from a user, storing the input as a setting in a user profile, and determining the stimulus based on the user profile.

The method may include mapping information regarding a type of stimulus to which the user generated an ERP value above a predetermined reference value as an EEG signal property of the user and storing the mapped information in a database.

The method may include matching the obtained EEG signal to a time point when the stimulus was presented to the user, designating a region of interest (ROI) time period extending before and after the time point, analyzing EEG data corresponding to a plurality of stimuli within the ROI to determine to which stimulus the user generated the highest ERP value, and storing a stimulus parameter of the determined stimulus as an EEG signal property of the user in a database.

The method may include determining at least one EEG signal property from the obtained EEG signal, and storing the at least one EEG signal property as data associated with the user in a database.

The at least one EEG signal property may include at least one of a channel from which an event-related potential (ERP) is detected when the user reacts to the stimulus, an amplitude related to the ERP that is detected, and a time when the amplitude related to the ERP is generated.

Controlling the display apparatus based on the EEG signal further include comparing a newly obtained EEG signal with the at least one EEG signal property to determine whether the user has reacted to the stimulus.

BRIEF DESCRIPTION OF THE DRAWINGS

These and/or other features and utilities of the present general inventive concept will become apparent and more readily appreciated from the following description of the embodiments, taken in conjunction with the accompanying drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

The present embodiments may have different forms and should not be construed as being limited to the descriptions set forth herein. Accordingly, the embodiments are merely described below, by referring to the figures, to explain features and utilities of the present general inventive concept. As used herein, the term "and/or" includes any and all combinations of one or more of the associated listed items. Expressions such as "at least one of," when preceding a list of elements, modify the entire list of elements and do not modify the individual elements of the list.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

In the description, a "display apparatus" refers to any apparatus that may display a screen to a user. For example, the display apparatus may include desktop computers, mobile computers such as laptops, netbooks, or tablet computers, mobile devices such as smartphones, global positioning devices, wearable devices or personal digital assistants (PDAs), and electronic devices which may output data to a screen via a display unit, such as TVs, various types of flat screens (e.g., plasma screen, liquid-crystal display (LCD) screens, light-emitting diode (LED) displays, active-matrix organic light-emitting diode (AMOLED) displays, etc.), or projection devices.

An "electroencephalography (EEG) signal" refers to an ionic current flow that is generated when the EEG signal is transmitted from a nervous system to neurons of a brain. In the description, the EEG signal may have the same meaning as brain waves. The EEG signal may vary according to a condition of the mind and body of a user of the present general inventive concept, and is an important index for measuring brain activity.

The EEG signal may be detected by using a plurality of sensors that are attached to a scalp of the user. Each of the plurality of sensors may be a channel to receive the EEG signal.

In a method of controlling a display apparatus by using the EEG signal, an intention of the user may be identified from an event-related potential (ERP) that is generated due to a predetermined stimulus that arouses the user's attention. An intention of the user may include selecting a particular selection item or other ways of controlling or manipulating the display apparatus, as will be further discussed below.

For example, the method of controlling the display apparatus may include detecting a P300 (P3) component, that is, an ERP detected about 300 ms after stimulating the user (e.g., visibly, audibly, etc.), then using the P3 component to determine an intention of the user and controlling the display apparatus based on the intention of the user. Before detecting the P3 component from the EEG signal, a display control apparatus may be calibrated to the user.

Calibrating the display control apparatus may include adjusting a method of detecting the P3 component (or other ERP) so that the intention of the user that is determined based on the EEG signal accurately corresponds to an actual intention of the user. In order to adjust the method of detecting the P3 component, a correlation between various stimuli and P3 components may be defined and stored in a database. A P3 component related to a certain stimulus may be determined by using the correlation information stored in the database.

For example, before detecting a P3 component from the user which is generated due to a visual stimulus, an additional stimulus other than the visual stimulus, for example, an auditory stimulus, may be presented to the user. Then, by using an ERP that is generated due to the additional stimulus other than the visual stimulus, the display control apparatus may be calibrated. In other words, the method of detecting the P3 or other ERP may be adjusted to improve accuracy, as further described below.

When the display control apparatus controls the display apparatus by using an EEG signal obtained in response to a stimulus that is presented to the user, an accuracy of controlling the display apparatus may vary according to user environments.

The accuracy of controlling the display apparatus refers to a similarity between the actual intention of the user and the intention that is determined based on the EEG signal, that is, how accurately the display apparatus is being controlled with respect to the actual intention of the user.

Therefore, in order to increase the accuracy of controlling the display apparatus, the display control apparatus may consider the user environment. For example, the accuracy of controlling the display apparatus, such as a TV, may depend on a distance between the user and the TV. In an example, the TV is controlled by using an EEG signal obtained in response to a visual stimulus that is presented to the user via a TV screen. In this case, an accuracy of controlling the TV by using the EEG signal obtained from the user when a space between the user and the TV is about 3 m, which is a general TV viewing distance, may be different from an accuracy of controlling the TV by using the EEG signal obtained from the user when a space between the user and the TV is about 1 m or about 5 m.

Therefore, in order to increase the accuracy of controlling the display apparatus, a screen composition and a stimulus to be presented to the user may vary according to information regarding the user environment, such as a distance between the display apparatus and the user. Furthermore, other information regarding the user environment or the user himself/herself may considered, as will be discussed below.

In order to induce a brain wave reaction from the user in relation to the stimulus, conditions of presenting the stimulus based on at least one of the user environment, properties of brain wave reaction of the user, and user preference may be adjusted in the apparatus and method of controlling the display apparatus according to an exemplary embodiment of the present general inventive concept.

According to the apparatus and method of controlling the display apparatus according to an embodiment of the present general inventive concept, the stimulus to be presented to the user may be determined by using information regarding the user environment. Then, the display apparatus is controlled by an EEG signal obtained in response to the stimulus that is determined. Thus, the accuracy of controlling the display apparatus may be increased.

Figure 2:
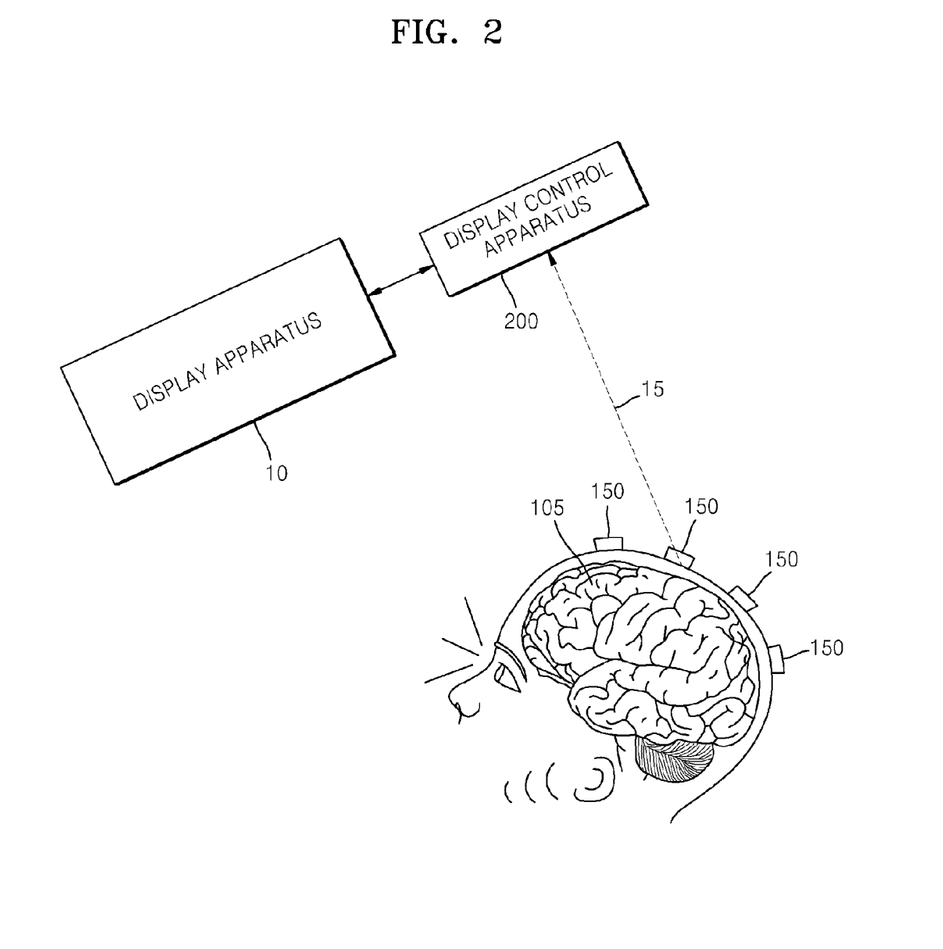
FIG. 2 is a conceptual view illustrating a display control apparatus to control a display apparatus, according to an exemplary embodiment of the present general inventive concept.

Hereinafter, a display control apparatus 200 according to an exemplary embodiment of the present general inventive concept is described with reference to FIG. 2. FIG. 2 illustrates the display control apparatus 200 to control a display apparatus 10, according to an exemplary embodiment of the present general inventive concept. The display control apparatus 200 will be discussed in greater detail below with reference to FIG. 7.

As illustrated in FIG. 2, the display control apparatus 200 according to an exemplary embodiment of the present general inventive concept controls the display apparatus 10 by using an EEG signal 15 that is obtained from the brain of a user 105.

The EEG signal 15 may be obtained through sensors 150 that are attached to the head of the user 105, and may be transmitted to the display control apparatus 200 via a wired or wireless connection. The display control apparatus 200 analyzes the EEG signal 15 that is obtained from the user 105, determines an intention of the user 105 who wants to control the display apparatus 10, and thus, controls the display apparatus 10 based on a determined result.

The display control apparatus 200 and the display apparatus 10 may be wired or connected wirelessly. Also, although FIG. 2 illustrates the display control apparatus 200 separate from the display apparatus 10, the display control apparatus 200 and the display apparatus 10 may alternatively have a combined form.

According to a method of controlling the display apparatus 10 by using the display control apparatus 200 according to an exemplary embodiment of the present general inventive concept, a stimulus may be determined by using information regarding the user environment. Then, the stimulus may be presented to the user 105, and an EEG signal 15 from the user may be obtained in response to the stimulus and may be analyzed. Thus, the analysis accuracy of the display control apparatus 200 may be increased due to the stimulus determined based on the information regarding the user environment.

The information regarding the user environment may include, for example, a distance between the display apparatus and the user, luminance around the display apparatus, luminance around the user, and a user's degree of sensitivity to a visual stimulus, but is not limited thereto.

According to the method of controlling the display apparatus 10 according to an exemplary embodiment of the present general inventive concept, a stimulus may be determined based on the information regarding the user environment, from among stimuli that are recognizable by any one of the five senses of the user. The stimulus that is presented to the user may be any one of a visual stimulus, an auditory stimulus, a tactile stimulus, a gustatory stimulus, and an olfactory stimulus. For example, when a distance between the user and a screen of the display apparatus 10 is a predetermined distance or more, the user may not be able to receive the visual stimulus from the display apparatus. In this case, the display control apparatus 200 according to an exemplary embodiment of the present general inventive concept may use a method of presenting an auditory stimulus and detecting the auditory stimulus, or a method of detecting an imagery of voluntary movement from the user.

The detection of the imagery of voluntary movement is one type of brain computer interface (BCI) method of detecting movements that are imagined by the user. For example, based on an imagery of the user raising a left hand, the display control apparatus 200 may control the display apparatus 10 so that a leftmost portion of a menu is executed from among a menu that is displayed on the display apparatus 10.

In the method of controlling the display apparatus 10 according to an exemplary embodiment of the present general inventive concept, a stimulus parameter may be determined based on the information regarding the user environment. For example, when the stimulus includes the auditory stimulus, the stimulus parameter may include at least one of frequency of the auditory stimulus, a sound pressure level of the auditory stimulus, a tone of the auditory stimulus, and a direction of the auditory stimulus that is recognized by the user. Alternatively, when the stimulus includes the visual stimulus, the stimulus parameter may include, for example, brightness of the visual stimulus, a form of the visual stimulus, a color of the visual stimulus, a duration of the visual stimulus, a number of times that the visual stimulus is repeated, and the like.

Hereinafter, a method by which the display control apparatus 200 controls the display apparatus 10 according to an exemplary embodiment of the present general inventive concept is described with reference to FIG. 3.

Figure 3:
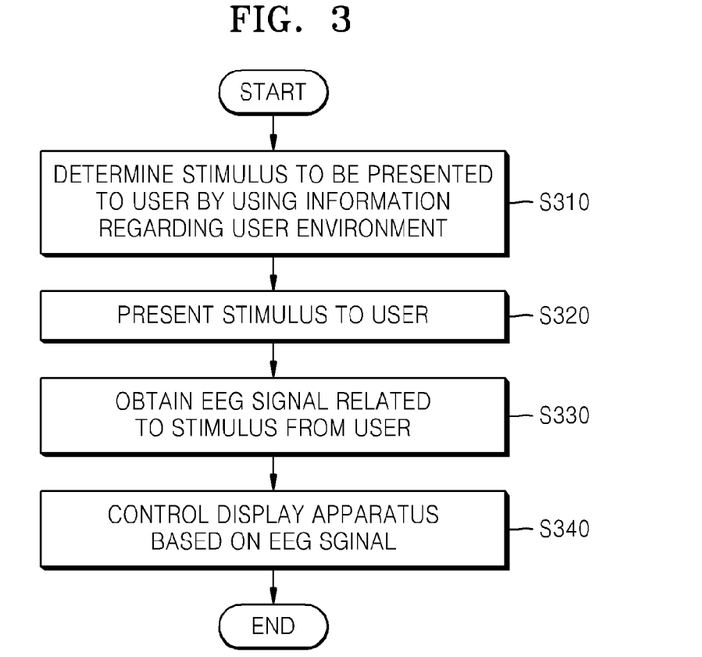
FIG. 3 is a flowchart illustrating a method of controlling the display apparatus, according to an exemplary embodiment of the present general inventive concept.

FIG. 3 illustrates a method of controlling the display apparatus 10, according to an exemplary embodiment of the present general inventive concept.

In operation S310, the display control apparatus 200 according to an exemplary embodiment of the present general inventive concept determines the stimulus to be presented to the user, by using information regarding the user environment. Information regarding the user environment may be inputted by the user and/or detected by the display control apparatus 200.

The display control apparatus 200 may determine a type of the stimulus to be presented to the user by using the information regarding the user environment. That is, the display control apparatus 200 may determine to present a stimulus from among stimuli that are recognizable by any one of the five senses of the user. For example, the display control apparatus 200 may present a visual stimulus by using the display apparatus 10, or present an auditory stimulus via a headset or a speaker that is included in or separately provided from the display apparatus 10. However, a method of presenting the stimulus is not limited thereto.

The display control apparatus 200 may present the visual stimulus as a default stimulus. When it is determined by using the information regarding the user environment, that the user may not receive the visual stimulus, the display control apparatus 200 may present the auditory stimulus to the user. For example, when a distance between the display apparatus and the user is equal to or greater than a predetermined distance, the display control apparatus 200 may determine to present the auditory stimulus to the user.

In addition, the display control apparatus 200 may determine a stimulus parameter. The stimulus parameter refers to a value that represents properties of the stimulus, such as, for example, intensity of the stimulus, duration of the stimulus, or the number of times that the stimulus is repeated.

For example, a stimulus parameter of the auditory stimulus may include at least one of a frequency of the auditory stimulus, a sound pressure level of the auditory stimulus, a tone of the auditory stimulus, and a direction of the auditory stimulus that is recognized by the user. The display control apparatus 200 may respectively present sounds having different intensities and durations to the right and left ears of the user so that the user may feel as if the sounds are transmitted from sound sources located in certain directions.

As another example, a stimulus parameter of the visual stimulus may include at least one of a display location of the visual stimulus on a screen of the display apparatus 10, a brightness of the visual stimulus, a form of the visual stimulus, a color of the visual stimulus, a duration of the visual stimulus, and a number of times the visual stimulus is repeated.

The information regarding the user environment may be inputted by the user and/or detected by the display control apparatus 200 and may include at least one of a distance between the display apparatus 10 and the user, a luminance around the display apparatus 10, a luminance around the user, and user information.

The user information may include, for example, respective degrees of sensitivity of each user to a predetermined stimulus, respective degrees of tiredness of each user to the predetermined stimulus, a stimulus parameter that is predetermined for each user, and the like. The display control apparatus 200 may include default settings of user information which are generally usable by most users but may be adjusted according to an individual user preference.

As another example of the user information, the display control apparatus 200 may use EEG signal properties respective to each of the users.

The display control apparatus 200 may determine the EEG signal properties respective to each of the users from EEG signals that have previously been obtained. The display control apparatus 200 may map and store information regarding each of the users and the EEG signal properties respective to each of the users in advance and/or on an ongoing basis. For example, the display control apparatus 200 may store a type of stimulus or a stimulus parameter of a stimulus to which a user strongly reacted as an EEG signal property of the user in a database.

The display control apparatus 200 may identify a user, and then determine an optimal type of stimulus or stimulus parameter to present by using the EEG signal property that is mapped with respect to the identified user.

As another example of the user information, the display control apparatus 200 may use stimulus parameters that are inputted and stored in advance with respect to each of the users.

The display control apparatus 200 may receive an input setting of a stimulus parameter from a certain user. That is, the certain user may preset a stimulus parameter for a stimulus that causes the lowest degree of tiredness or irritation in the certain user so as to reduce the degree of tiredness or irritation of the stimulus that the user feels when using the display control apparatus 200.

The display control apparatus 200 may map and store a profile of each of the users and the respective stimulus parameters of the users. The display control apparatus 200 may therefore identify a user and use the stimulus parameter that is stored in advance with respect to the identified user as the user information.

In operation S320, the display control apparatus 200 according to an exemplary embodiment of the present general inventive concept presents the stimulus that is determined in operation S310 to the user.

The display control apparatus 200 generates the stimulus according to the type of the stimulus and the stimulus parameter, and presents the generated stimulus to the user by using the display apparatus 10 or a separate device.

When using the EEG signal obtained in response to the visual stimulus which is obtained from the user, first, the display control apparatus 200 may display a selection screen on the display apparatus 10. The user may manipulate the display apparatus 10 by selecting at least one selection menu that is displayed in the selection screen on display apparatus 10, or at least one selection item that is displayed within the at least one selection menu.

For example, the at least one selection menu may include a menu that lists at least one TV channel. The menu related to the at least one TV channel may include a user interface to change a TV channel, such as an interface in which a command to change the TV channel or channel numbers may be input by using an arrow, a number pad, or icons including images that respectively correspond to the plurality of TV channels. For example, the user may change the TV channels by selecting the user interface to change the TV channels or an icon corresponding to a TV channel, which are displayed on the TV.

The display control apparatus 200 may present the visual stimulus to the user, for example, by highlighting at least one selection menu or a selection item included in the at least one selection menu a predetermined number of times at a predetermined interval. The predetermined number of times and the predetermined interval for highlighting a selection menu and/or selection item may be determined based on a user input and stored as a setting per user. The predetermined number of times and the predetermined intervals for highlighting a selection menu and/or selection item may be determined based on types or the number of selection menus and/or selection items that are displayed. A predetermined order for highlighting each of the at least one selection menu and/or selection items may be an order that is stored in advance or a random order.

For example, in order to highlight a selection menu, the display control apparatus 200 may display the selection menu on the display apparatus 10 such that brightness of at least one portion of edges of the selection menu, a display location of the selection menu, or a shape or a color of the selection menu is changed.

A method of presenting the visual stimulus will be described in detail with reference to FIG. 4.

When using the EEG signal of the user that is generated in response to the auditory stimulus and is obtained from the user, the display control apparatus 200 may generate sounds that respectively correspond to the at least one selection menu and/or selection item on the display apparatus 10. The user may react to the sounds that respectively correspond to the at least one selection menu presented by the display apparatus 10, select the at least one selection menu, and manipulate the display apparatus 10. The sounds that respectively correspond to the at least one selection menu may be sounds that have different auditory stimulus parameters. For example, when a selection menu is a menu to select a TV channel, the sounds that respectively correspond to the selection menu may include the sound that is broadcasted through the TV channel.

In operation S330, the display control apparatus 200 according to an exemplary embodiment of the present general inventive concept obtains, from the user, the EEG signal of the user that is generated in response to the stimulus presented in operation S320.

The display control apparatus 200 may obtain the EEG signal that is detected via the scalp of the user. The display control apparatus 200 may include a plurality of sensing modules 150 that are attached to the scalp of the user and obtains the EEG signal.

The EEG signal may be obtained by using a plurality of channels that respectively correspond to the plurality of sensing modules that are attached to the scalp of the user. For example, the obtained EEG signal may include a P3 component, that is, an ERP that is detected about 300 ms after presenting the visual stimulus.

When the user focuses on a certain selection menu with the intent to select the certain selection menu, the display control apparatus 200 may obtain, from the user, an EEG signal in response to the visual stimulus that is presented with respect to the certain selection menu.

In an example, the display control apparatus 200 displays at least one selection menu and/or selection item, and visual stimuli that respectively correspond to the at least one selection menu and/or selection item are displayed via the display apparatus 10. When the user focuses on a selection that the user wants to select from among the at least one selection menu and/or selection item, the display control apparatus 200 may obtain an EEG signal that is received from at least one channel. The received EEG signal may be synchronized with a visual stimulus that is presented.

In operation S340, the display control apparatus 200 according to an exemplary embodiment of the present general inventive concept controls the display apparatus 10 based on the EEG signal that is obtained in operation S330.

In order to control the display apparatus 10, the display control apparatus 200 may include a controller or processor to preprocess the EEG signal. Then, the display control apparatus 200 may determine a visual stimulus to which the user has reacted based on the preprocessed EEG signal.

For example, the display control apparatus 200 may preprocess the EEG signal by performing various filtering processes on the EEG signal so as to remove various types of noise that may be included in the EEG signal.

For example, a band pass filtering process may be performed on the EEG signal. When the band pass filtering process is performed, only signals within a certain critical frequency range, such as about 0.5 Hz to about 20 Hz, may remain.

As another example, the display control apparatus 200 may perform common average reference derivation, Laplacian filtering, independent component analysis, and the like on the obtained EEG signal.

The display control apparatus 200 matches the EEG signal from which noise has been removed, to a time point when a stimulus was presented to the user. EEG data obtained before and after the time point when the stimulus is presented to the user, for example, 100 ms before and 300 ms after the stimulus is presented, is determined as EEG data in a region of interest (ROI).

The display control apparatus 200 obtains a plurality of EEG data in the ROI corresponding to a plurality of stimuli and compares the plurality of EEG data with each other. Based on a result of the comparison, the display control apparatus 200 determines a stimulus to which the user has reacted the strongest.

The stimulus to which the user has reacted the strongest may be determined by analyzing an ERP that is related to the stimulus. In particular, when analyzing the ERP related to the stimulus that is recognized by physical senses of the user, the stimulus to which the user has reacted the strongest may be determined based on an amplitude or latency of the ERP, representatively, a P3 component or a N200 (N2) component, which is an ERP which peaks 200-350 ms post-stimulus.

In order to determine the stimulus to which the user has reacted the strongest, the display control apparatus 200 may use EEG data in the ROI related to the same type of stimulus. Also, in order to increase accuracy, the display control apparatus 200 may repeatedly present the same type of stimulus so as to use the EEG data in the ROI related to the same type of stimulus that is repeatedly presented.

The display control apparatus 200 may additionally perform an operation of calibrating EEG data obtained in response to a stimulus by using the EEG signal properties which have been learned for each user.

The EEG signal properties respective to each of the users may include at least one of a channel from which an ERP is detected when the user reacts to the stimulus, the amplitude related to the ERP that is detected, and the time when the amplitude related to the ERP is generated.

Based on the respective EEG signal properties of the users related to the stimulus, the display control apparatus 200 may learn an EEG signal that is to be obtained when the user reacts to a target stimulus (for example, a stimulus related to a selection menu that the user wants to select), and an EEG signal that is to be obtained when the user reacts to a stimulus other than the target stimulus. Therefore, the display control apparatus 200 may analyze a newly obtained EEG signal by comparing EEG signal properties corresponding to the newly obtained EEG signal against the EEG signal properties respective to each of the users which have already been learned, and thus determine whether or not a user has reacted to a certain stimulus.

The display control apparatus 200 may select and execute at least one selection menu and/or a selection item included in the at least one selection menu that is displayed on the display apparatus 10, based on the EEG signal that is obtained from the user.

The display control apparatus 200 may analyze the EEG signal by using a plurality of algorithms, and thus determine a selection which the user has reacted to from among the at least one selection menu and/or selection item displayed on the display apparatus 10. The plurality of algorithms to analyze the EEG signal obtained from the user may include, for example, linear discriminant analysis (LDA), a support vector machine (SVM), random forest (RF), or the like.

Based on a result determined by using the plurality of algorithms, the display control apparatus 200 may select a selection menu or a selection item from the at least one selection menu displayed on the display apparatus 10.

From among the at least one selection menu and/or selection item displayed on the display apparatus 10, the display control apparatus 200 may determine which selection the user has reacted to, by using each of the plurality of algorithms. The display control apparatus 200 may combine results that are determined by the plurality of algorithms, and then determine the selection menu or selection item that the user wants to select.

For example, according to the results that are determined by the plurality of algorithms, the display control apparatus 200 may determine that a selection menu that is selected the most is the selection menu that the user wants to select. Alternatively, according to an average of the results that are determined by the plurality of algorithms, the display control apparatus 200 may determine the selection menu that the user wants to select.

The display control apparatus 200 may control the display apparatus 10 so that a selection menu or item that is determined as the selection menu or item that the user wants to select (hereinafter, referred to as "the determined selection") is executed. For example, the display control apparatus 200 may display selection items or a submenu that corresponds to the determined selection, execute an application that corresponds to the determined selection, reproduce an image or a video that corresponds to the determined selection, or change to a TV channel that corresponds to the determined selection.

Based on the EEG signal obtained from the user, when the user is determined to be asleep, the display control apparatus 200 may turn off the display apparatus 10.

Whether or not the user is asleep may be determined by detecting brain waves indicating a sleep state of the user, a state in which a degree of concentration of the user is continuously decreasing, or a state in which eyes of the user are closed, based on the EEG signal obtained from the user. Alternatively, whether or not the user is asleep may be determined by combining detection results. The state in which the degree of concentration of the user is continuously reduced may be determined by comparing a degree of concentration determined based on the EEG signal obtained from the user with a certain reference value. The state in which eyes of the user are closed may be detected based on the EEG signal, or by using separate sensors to detect an eye movement of the user.

For example, when the degree of concentration of the user is equal to or less than the certain reference value, the display control apparatus 200 may present a feedback regarding the degree of concentration of the user, to the user, determine that the user is asleep, and then turn off the display apparatus 10. Alternatively, when it is detected that the user's eyes have been closed for a predetermined time period based on the EEG signal obtained from the user, the display control apparatus 200 determines that the user is asleep, and then turns off the display apparatus 10.

Figure 4:
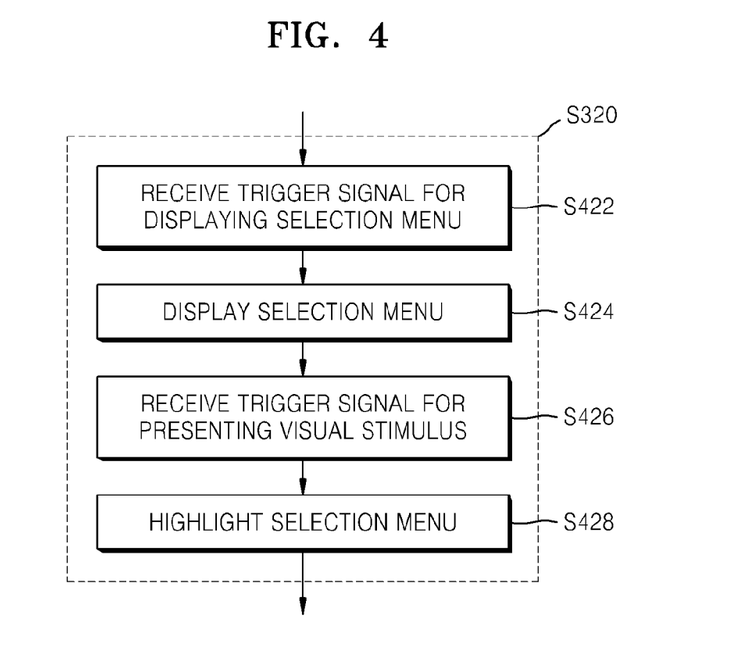
FIG. 4 is a flowchart illustrating a method of generating a visual stimulus, in the method of controlling the display apparatus, according to an exemplary embodiment of the present general inventive concept.

FIG. 4 illustrates a method of generating the visual stimulus, in the method of controlling the display apparatus 10, according to an embodiment of the present general inventive concept.

As illustrated in FIG. 3, in operation S320, the display control apparatus 200 presents the stimulus that is determined in operation S310 to the user. In this case, the display control apparatus 200 may present the visual stimulus as a stimulus to obtain the EEG signal. Hereinafter, a method of presenting the visual stimulus related to at least one selection menu or selection item so as to select and execute the at least one selection menu or selection item based on the EEG signal obtained from the user is described with reference to FIG. 4.

In operation S422, the display control apparatus 200 according to an exemplary embodiment of the present general inventive concept may receive a trigger signal to display a selection screen.

According to an embodiment of the present general inventive concept, the trigger signal to display the selection screen may include, for example, a signal that is generated based on an eye movement that is detected by using the EEG signal obtained from the user.

In this example, when an eye movement that is detected by using the EEG signal obtained from the user corresponds to a predetermined eye movement, the display control apparatus 200 may determine that the trigger signal to display the selection screen is received.

For example, when the eye movement that is detected by using the EEG signal obtained from the user is a consecutive eye-blinking movement, or an eye-closing movement for a certain period, the display control apparatus 200 may display the selection screen.

According to another exemplary embodiment of the present general inventive concept, the trigger signal to display the selection screen may include a signal that is generated based on a mental state of the user which is detected by using the EEG signal obtained from the user.

The mental state of the user which is detected by using the EEG signal obtained from the user may include degrees of concentration, boredom, tiredness, or the like, experienced by the user. The display control apparatus 200 may compare a predetermined value of the mental state of the user with a predetermined reference value, and then determine whether or not the trigger signal to display the selection screen is received.

For example, the display control apparatus 200 may detect the mental state of a user that is watching a screen displayed on the display apparatus 10. When the degree of concentration of the user is equal to or less than the certain reference value, the display control apparatus 200 may present feedback with respect to a current degree of concentration to the user by displaying a screen asking whether to change a currently displayed screen on the display apparatus 10 to a selection screen including the selection menu.

Alternatively, when the degree of concentration of the user is equal to or less than the certain reference value, the display control apparatus 200 may control the display apparatus 10 so that the currently displayed screen is automatically changed to the selection screen including the selection menu.

According to another exemplary embodiment of the present general inventive concept, the trigger signal to display the selection screen may include a signal that is generated based on the mental state and the eye movement of the user that are detected by using the EEG signal obtained from the user. When the eye movement that is detected corresponds to a predetermined eye movement and the degree of concentration of the user is equal to or less than the certain reference value, the display control apparatus 200 may determine that the trigger signal to display the selection screen is received.

According to another exemplary embodiment of the present general inventive concept, the trigger signal to display the selection screen may include a signal that is generated based on at least one of gestures, voice, and an eye movement of the user. When at least one of the gestures, the voice, and the eye movement of the user that is detected correspond to a predetermined condition, the display control apparatus 200 may determine that the trigger signal to display the selection screen is received.

In operation S424, when the trigger signal to display the selection screen is received, the display control apparatus 200 according to an exemplary embodiment of the present general inventive concept may display the selection screen.

When the trigger signal to display the selection screen is received, the display control apparatus 200 may control the display apparatus 10 so that a home screen that is displayed on the display apparatus 10 is changed to the selection screen including the selection menu.

The selection menu may be displayed, for example, as an image, a video, or a text on the display apparatus 10.

Figure 5A:
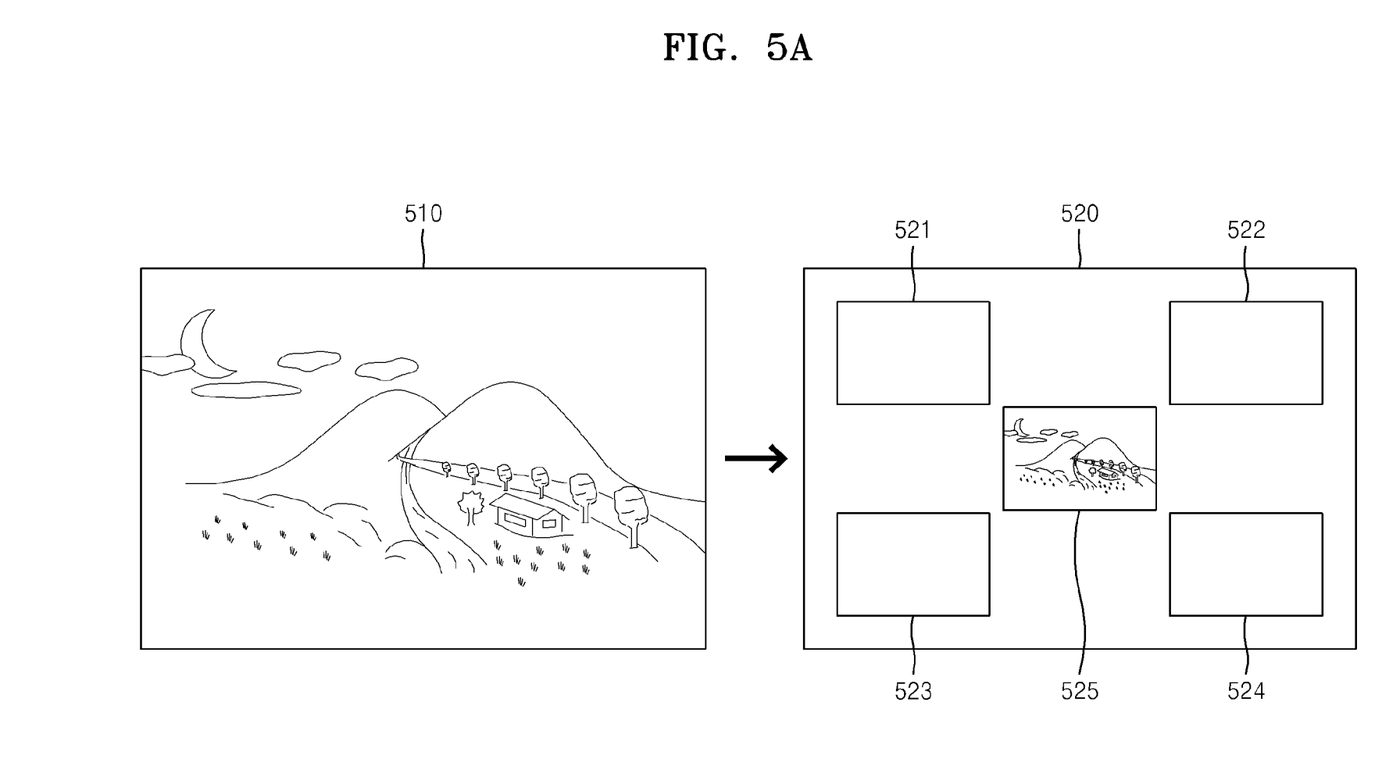
FIGS. 5A and 5B are views illustrating examples of a screen that is displayed according to the method of controlling the display apparatus, according to an exemplary embodiment of the present general inventive concept.
Figure 5B:
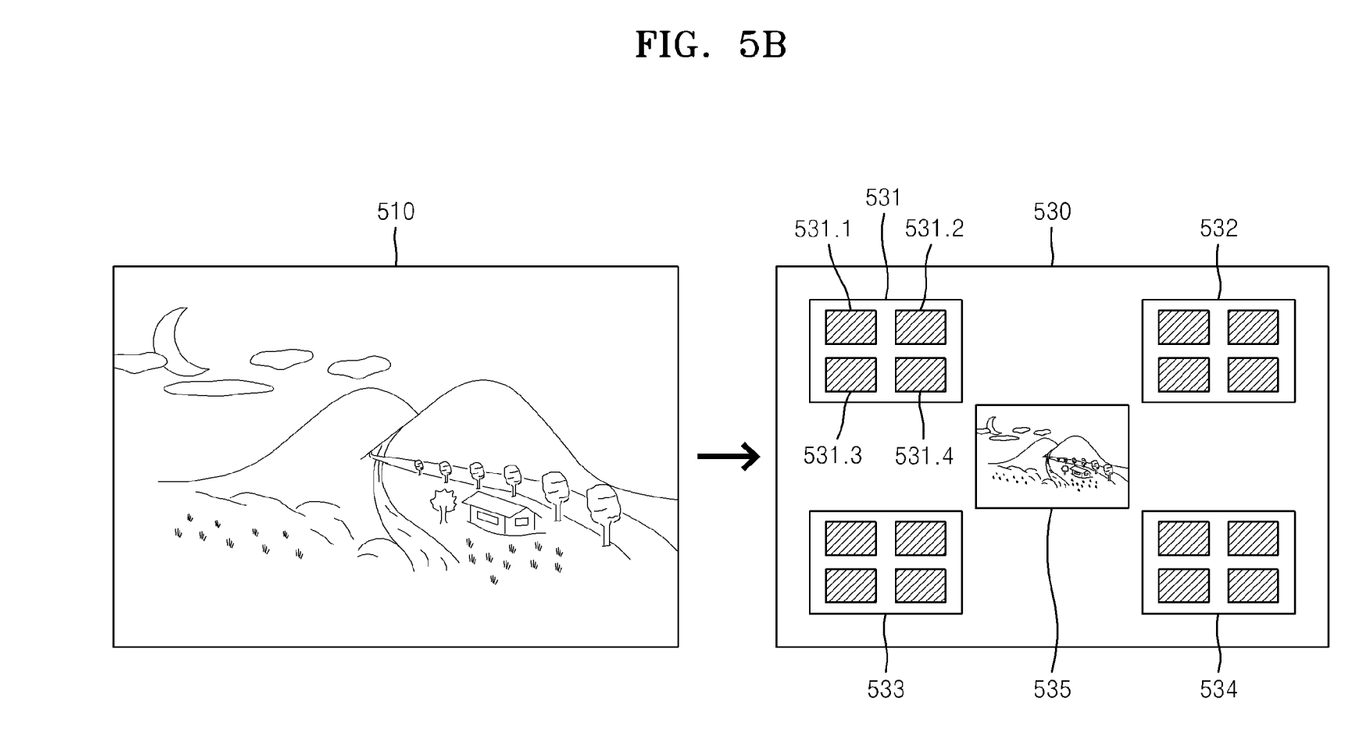

FIGS. 5A and 5B are views illustrating examples of the selection screen including the selection menu that is displayed on the display apparatus 10 by the display control apparatus 200.

As illustrated in FIGS. 5A and 5B, when the trigger signal to display the selection screen is received, a home screen 510 that has been displayed on the display apparatus 10 may be converted into partial screen 525 or 535.

For example, the home screen 510 of the display apparatus 10 may be a screen playing a video. When the trigger signal to display the selection screen is received, the home screen 510 playing the video may be converted into a partial screen 525. The display control apparatus 200 may control the display apparatus 10 so that the video which was playing on the home screen 510 is continuously reproduced within the partial screen 525 even while the home screen 510 playing the video is converted into the partial screen 525.

As illustrated in FIG. 5A, when the trigger signal to display the selection screen is received, a selection screen 520 including selection menus 521, 522, 523, and 524 may be displayed on the display apparatus 10.

For example, the selection menus 521, 522, 523, and 524 may include a thumbnail of an image or a video, a thumbnail of a TV channel, an icon to execute an application, a graphical user interface (GUI) to set functions of the display apparatus 10 or the display control apparatus 200, a list or group of selection items, or the like that may be displayed on the display apparatus 10.

When the display apparatus 10 is a TV, the display control apparatus 200 may select one or more channels that are broadcasting the most appropriate TV program for the user, based on the mental state of the user. In this case, the display control apparatus 200 may display a thumbnail of a selected channel as, e.g., the selection menu 521, on the display apparatus 10.

Alternatively, the display control apparatus 200 may analyze TV viewing records of the user, select channels that are broadcasting TV programs that the user has frequently watched, and display respective thumbnails of the selected channels on the display apparatus 10 as selection menus 521, 522, 523, and 524.

As illustrated in FIG. 5B, when the trigger signal to display the selection screen is received, the home screen 510 is converted into the partial screen 535, and a selection screen 530 including selection menus 531, 532, 533, and 534 may be displayed on the display apparatus 10.

The display control apparatus 200 may combine a plurality of selection items 531.1, 531.2, 531.3, and 531.4 into the selection menu 531 and display the selection menu 531 on the display apparatus 10. Selection items 531.1, 531.2, 531.3 and 531.4 may be, for example, text, titles, graphics (e.g., station logos, movie poster thumbnails, TV show thumbnails), icons, videos, setting values, applications, or some combination thereof that communicates additional items which may be selected within selection menu 531.

For example, the display control apparatus 200 may classify a plurality of TV channels into separate categories, and display a selection menu to select the categories on the display apparatus 10. When the user selects a category, a selection menu to select the plurality of channels that are included in the selected category may be displayed on the display apparatus 10, for example via a listing of title selection items or via a listing of selection menus showing thumbnails or miniature videos of the plurality of channels.

The selection screen of the present general inventive concept is not limited to the examples provided above. For example, the selection screen could comprise a full screen to display a selection menu, a split screen to display a selection menu on one side, a picture-in-a-picture (PIP) screen to display a selection menu in a box on the home screen, a display of a selection menu along a border of the home screen, or other configurations that provide for a display of a selection menu.

In operation S426, the display control apparatus 200 according to an exemplary embodiment of the present general inventive concept may receive a trigger signal in order to present the visual stimulus.

For example, the trigger signal to present the visual stimulus may include a signal that is generated based on the eye movement that is detected by using the EEG signal obtained from the user, or a signal that is generated based on a mental state of the user that is detected by using the EEG signal obtained from the user.

As another example, the trigger signal to present the visual stimulus may include a signal that is generated based on at least one of the gestures, the voice, and the eye movement of the user. When at least one of the gestures, the voice, and the eye movement of the user that is detected correspond to a predetermined condition, the display control apparatus 200 may determine that the trigger signal to present the visual stimulus is received.

In operation S428, when the trigger signal to present the visual stimulus is received, the display control apparatus 200 according to an exemplary embodiment of the present general inventive concept may highlight at least one selection menu or selection item that is being displayed on the display apparatus 10.

When there is no selection menu or selection item that the user wants to select from among the at least one selection menu and/or selection item that is being displayed, the user may perform a predetermined act, such as a predetermined eye movement, to control the display apparatus 10 so that the display apparatus 10 reverts back to displaying the home screen 510. Thus, for example, when an eye movement that is detected by using the EEG signal obtained from the user corresponds to the predetermined eye movement, the display control apparatus 200 may control the display apparatus 10 so that the selection screen 520, 530 is changed to the home screen 510.

Also, when the user does not react to the visual stimulus within a predetermined time, the display control apparatus 200 may control the display apparatus 10 so that the selection screen 520, 530 is changed to the home screen 510.

Figure 6A:
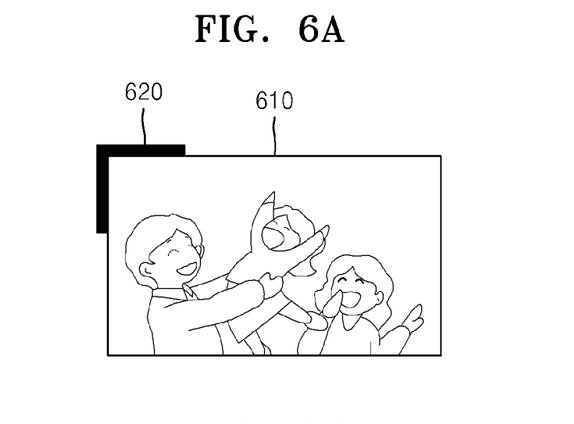
FIGS. 6A, 6B, and 6C are views illustrating examples of the visual stimulus that is displayed according to the method of controlling the display apparatus, according to an exemplary embodiment of the present general inventive concept.
Figure 6B:
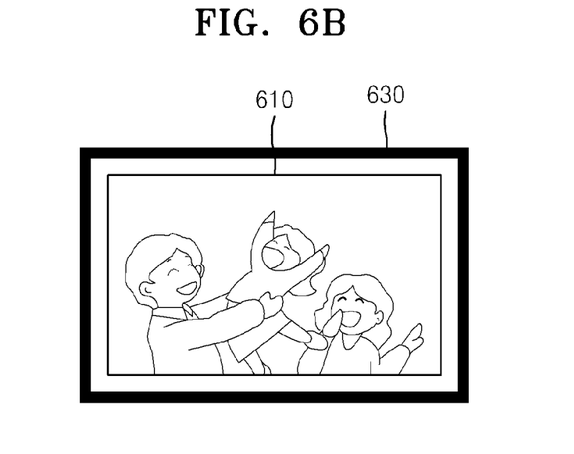
Figure 6C:
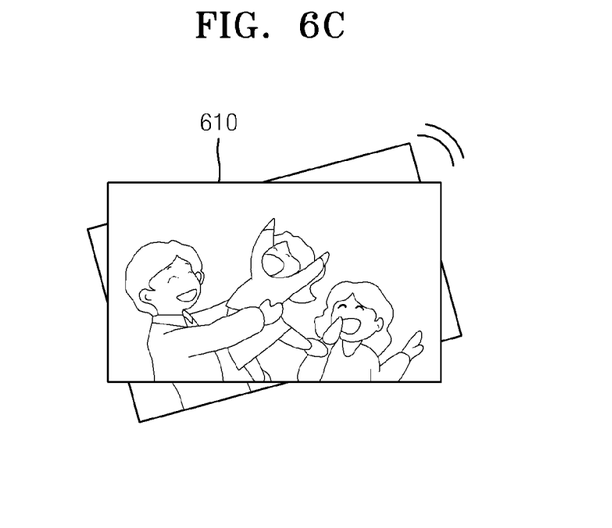

FIGS. 6A, 6B, and 6C are views illustrating examples of the visual stimulus that may be displayed according to the method of controlling the display apparatus, according to an exemplary embodiment of the present general inventive concept.

The display control apparatus 200 according to an exemplary embodiment of the present general inventive concept may highlight a selection menu or a selection item to present the visual stimulus to the user.

For example, the display control apparatus 200 may present the visual stimulus by causing a portion of the screen including the selection menu or selection item to flash, or by using visual effects such as vibrating the portion of the screen including the selection menu or selection item. Thus, the user may feel less tired due to the visual stimulus.

As illustrated in FIG. 6A, for example, the display control apparatus 200 may present the visual stimulus to the user by displaying a selection menu 610 such that brightness of a portion of edges 620 changes.

As illustrated in FIG. 6B, the display control apparatus 200 may present the visual stimulus to the user by displaying the selection menu 610 such that brightness of edges 630 changes.

As illustrated in FIG. 6C, the display control apparatus 200 may present the visual stimulus to the user by displaying the selection menu 610 by using visual effects such as vibrating or rotating the selection menu 610 so that a display location of the selection menu 610 changes.

The display control apparatus 200 according to an exemplary embodiment of the present general inventive concept may be configured to generate the visual stimulus based on variable visual stimulus parameters so that the user may feel less tired or irritated due to the visual stimulus.

For example, before presenting the visual stimulus, based on a user input, the display control apparatus 200 may determine a display location of the visual stimulus, a color of the visual stimulus, a size of the visual stimulus, a type of the visual stimulus, a duration of the visual stimulus, and the like, so that the user may feel less tired or irritated due to the visual stimulus.

As another example, based on the information regarding the user environment, the display control apparatus 200 may determine the display location of the visual stimulus, the color of the visual stimulus, the size of the visual stimulus, the type of the visual stimulus, the duration of the visual stimulus, and the like, so that the user may feel less tired or irritated due to the visual stimulus.

For example, the display control apparatus 200 may determine the user's degree of sensitivity to the visual stimulus, based on the distance between the display apparatus 10 and the user. As the user's degree of sensitivity to the visual stimulus increases, the display control apparatus 200 may reduce the intensity of the visual stimulus.

Visual stimuli that respectively correspond to each of the at least one selection menu or selection item displayed on the display apparatus 10 may be presented by the display apparatus 10 according to an order that is predetermined based on a predetermined number of times that each visual stimulus corresponding to each of the at least one selection menu occurs and a duration of each occurrence. Alternatively, the visual stimuli that respectively corresponds to each of the at least one selection menu or selection item displayed on the display apparatus 10 may be presented in a random order. Therefore, the visual stimuli may be presented in an order that may not be predicted by the user.

Figure 7:
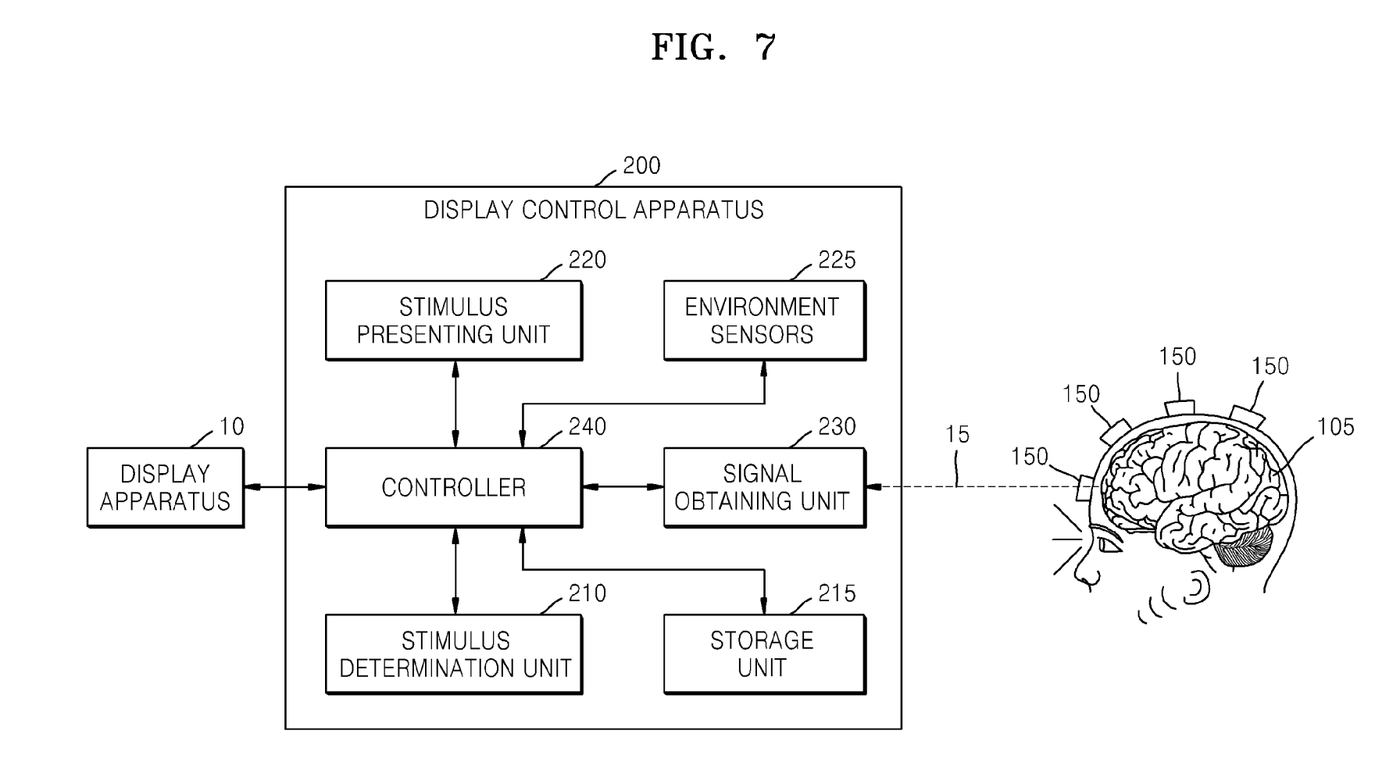
FIG. 7 is a block diagram illustrating the display control apparatus according to an exemplary embodiment of the present general inventive concept.

FIG. 7 is a block diagram illustrating the display control apparatus 200 according to an exemplary embodiment of the present general inventive concept.

The elements of the display control apparatus 200 according to an exemplary embodiment of the present general inventive concept are configured to execute operations illustrated in the method of controlling the display apparatus 10 of FIG. 3. Therefore, all of the above-described features and elements regarding the method of controlling the display apparatus 10 of FIG. 3 are applied to the display control apparatus 200 of FIG. 7.

The display control apparatus 200 according to an exemplary embodiment of the present general inventive concept controls the display apparatus 10 by using an EEG signal that is obtained from the brain of a user 105. The display control apparatus 200 according to an exemplary embodiment of the present general inventive concept may be implemented in various ways. For example, the display control apparatus 200 may be a device that is wired or connected wirelessly with the display apparatus 10, or a device that is included in the display apparatus 10.

Referring to FIG. 7, the display control apparatus 200 according to an exemplary embodiment of the present general inventive concept may include a stimulus determination unit 210, a storage unit 215, a stimulus presenting unit 220, environment sensors 225, a signal obtaining unit 230, and a controller 240.

Environment sensors 225 may comprise any of various sensors to detect information about the user environment, for example, luminance, auditory levels, or distance of the user from the display apparatus 200.

The stimulus determination unit 210 may comprise an integrated circuit or processor configured to determine a stimulus to be presented to the user by using information regarding the user environment. The information regarding the user environment may be received by a user input, environment sensors 225, or from an external device. The information regarding the user environment may include at least one of a distance between the display apparatus 10 and the user, a luminance of the surroundings of the display apparatus 10, a luminance of the surroundings of the user, and user information.

The stimulus presenting unit 220 may comprise an integrated circuit or processor configured to generate the stimulus that is determined by the stimulus determination unit 210 and presents the stimulus to the user. The stimulus presenting unit 220 may present a stimulus from among the stimuli that are recognizable by any of the five senses of the user or any combination thereof.

For example, the stimulus presenting unit 220 may present a visual stimulus based on the EEG signal obtained from the user 105 that is obtained by the signal obtaining unit 230. That is, the stimulus presenting unit 220 may receive a signal, generated based on at least one of a mental state and an eye movement of the user that are detected by using the EEG signal, as a trigger signal to display a selection screen. Then, when the trigger signal is received, the stimulus presenting unit 220 may display the selection screen, and present the visual stimulus that highlights at least one selection menu or selection item within a selection menu from the selection screen.

As another example, the stimulus presenting unit 220 may present an auditory stimulus based on the EEG signal obtained from the user 105 that is obtained by the signal obtaining unit 230. That is, the stimulus presenting unit 220 may receive the signal, generated based on at least one of the mental state and the eye movement of the user that are detected by using the EEG signal, as the trigger signal to display the selection screen. Then, when the trigger signal is received, the stimulus presenting unit 220 may generate a sound corresponding to the selection screen, and present an auditory stimulus having different stimulus parameters that respectively correspond to each of at least one selection menu or selection item within a selection menu from the selection screen.

The signal obtaining unit 230 obtains the EEG signal that is obtained from the user 105 in response to the visual stimulus. The signal obtaining unit 230 may obtain the EEG signal that is detected from the scalp of the user 105. The signal obtaining unit 230 may receive the EEG signal from the plurality of sensing modules 150 that are near or attached to the scalp of the user 105. Also, the signal obtaining unit 230 may include the plurality of sensing modules 150 that are near or attached to the scalp of the user 105 and obtain the EEG signal.

The controller 240 controls the display apparatus 10 based on the EEG signal. In addition, the controller 240 may control all operations performed by the display control apparatus 200. The controller 240 may also control the stimulus determination unit 210, the stimulus presenting unit 220, and the signal obtaining unit 230 so as to execute the method of controlling the display apparatus 10 according to an embodiment of the display apparatus.

The storage unit 215 stores information associated with operating the display control apparatus 200, for example, setting information, user profiles, and EEG signal property information associated with each user in a database.

Based on the EEG signal, the controller 240 may control the display apparatus 10 so that the at least one selection menu and/or selection item is displayed. The controller 240 may control the stimulus presenting unit 220 so that the stimulus presenting unit 220 generates the visual stimulus, and may control the display apparatus 10 so that the display apparatus 10 presents the visual stimulus to the user 105. The controller 240 may control the display apparatus 10 so that the display apparatus 10 displays the visual stimulus such that at least one selection menu or a selection item included in the at least one selection menu is highlighted. According to an embodiment of the present general inventive concept, each of the at least one selection menu and/or the selection items included in the at least one selection menu may be highlighted in a random order a predetermined number of times at a predetermined interval.

From among the at least one selection menu and/or selection item displayed on the display apparatus 10, the controller 240 may determine a selection menu or selection item to which the user 105 has reacted. When determining the selection menu or selection item to which the user 105 has reacted, the controller 240 may combine results that are determined by various algorithms, and use the combined results.

The controller 240 may control the display apparatus 10 so that the display apparatus 10 executes an operation that corresponds to the selection menu or selection item that has been determined as being selected by the user 105 (for example, operations of displaying a selection sub-menu, displaying a listing or group of selection items, executing an application, reproducing a video, or changing channels).

As described above, in an apparatus and a method of controlling a display apparatus according to the one or more of the above embodiments of the present general inventive concept, a user may control the display apparatus more conveniently, the display apparatus may be controlled with high accuracy according to an intention of the user, and the display apparatus may allow the user to feel less tired or irritated due to a stimulus to detect an EEG signal.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It should be understood that the exemplary embodiments described therein should be considered in a descriptive sense only and not for purposes of limitation. Descriptions of features or aspects within each embodiment should typically be considered as available for other similar features or aspects in other embodiments. For example, a single element may be separately implemented, and separate elements may be implemented in a combined form.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. A method of controlling a display apparatus, the method comprising:
 determining whether a distance between the display apparatus and a user is less than a predetermined distance to determine a type of a stimulus to be presented to the user;
 determining at least one parameter of the stimulus based on information regarding an environment of the user, the information regarding the environment including at least one of the distance determined between the display apparatus and the user, brightness around the display apparatus, and electroencephalogram (EEG) signal properties of the user;
 presenting an auditory stimulus as the type of the stimulus to the user when the distance between the display apparatus and the user is equal to or greater than the predetermined distance based on the determined parameter;
 presenting a visual stimulus as the type of the stimulus to the user when the distance between the display apparatus and the user is less than the predetermined distance based on the determined parameter;
 obtaining, from the user, an EEG signal in response to the stimulus; and
 controlling the display apparatus based on the EEG signal.
2. The method of claim 1, further comprising:
 determining the type of the stimulus to be presented to the user, wherein the determining of the type of the stimulus and the determining of the at least one parameter of the stimulus comprise:
determining, when the distance between the display apparatus and the user is greater than or equal to a predetermined distance, the at least one parameter of the stimulus that comprises at least one of a frequency of the auditory stimulus, a sound pressure level of the auditory stimulus, a tone of the auditory stimulus, and a direction of an auditory stimulus that is recognized by the user.

3. The method of claim 1, further comprising:
determining of the type of the stimulus,
wherein the determining of the type of the stimulus and the determining of the at least one parameter of the stimulus comprises:
determining, when the visual stimulus is determined as the stimulus to be presented to the user, the at least one parameter of the stimulus that comprises at least one of a display location of the visual stimulus on a screen of the display apparatus, brightness of the visual stimulus, a form of the visual stimulus, a color of the visual stimulus, a duration of the visual stimulus, and a number of times that the visual stimulus is repeated.

4. The method of claim 1, wherein, the presenting of the visual stimulus further comprises:
displaying at least one selection menu on a screen of the display apparatus; and
highlighting a selection menu included in the at least one selection menu individually in a random order a predetermined number of times at a predetermined interval.

5. The method of claim 4, wherein the highlighting of the selection menu comprises:
displaying the selection menu included in the at least one selection menu such that brightness of at least one portion of edges of the selection menu, a display location of the selection menu, or a shape or a color of the selection menu is changed.

6. The method of claim 4, wherein the controlling of the display apparatus comprises selecting and executing a selection menu from among the at least one selection menu based on the EEG signal.

7. The method of claim 1, wherein the controlling of the display apparatus comprises turning off the display apparatus when the user is determined to be asleep based on the EEG signal.

8. The method of claim 1, wherein the presenting of the visual stimulus further comprises:
detecting at least one of a mental state of the user and an eye movement of the user by using the EEG signal obtained from the user; and
displaying, based on at least one of the mental state of the user and the eye movement of the user detected, at least one selection menu on a screen of the display apparatus.

9. The method of claim 1, wherein the presenting of the visual stimulus comprises presenting a visual stimulus related to at least one selection menu that is displayed on the display apparatus, and
wherein the controlling of the display apparatus comprises:
determining, from among the at least one selection menu, a selection menu to which the user has reacted, by using a plurality of algorithms; and
selecting and executing the selection menu determined from among the at least one selection menu.

10. A display control apparatus comprising:
a controller configured to:
determine whether a distance between the display apparatus and a user is less than a predetermined distance to determine a type of a stimulus to be presented to a user;
determine at least one parameter of the stimulus to be presented to the user, based on information regarding an environment of the user, the information regarding the environment of the user including at least one of the distance determined between the display apparatus and the user, brightness around the display apparatus, and electroencephalogram (EEG) signal properties of the user,
control to present an auditory stimulus as the type of the stimulus to the user when the distance between the display apparatus and the user is equal to or greater than the predetermined distance based on the determined parameter, and
control to present a visual stimulus to the user as the type of the stimulus when the distance between the display apparatus and the user is less than the predetermined distance based on the determined parameter; and
a signal obtaining device configured to obtain, from the user, an EEG signal in response to the stimulus,
wherein the controller controls the display apparatus based on the EEG signal.

11. The display control apparatus of claim 10, wherein when the distance determined between the display apparatus and the user is greater than or equal to the predetermined distance, the controller determines the at least one parameter of the stimulus that comprises at least one of a frequency of the auditory stimulus, a sound pressure level of the auditory stimulus, a tone of the auditory stimulus, and a direction of an auditory stimulus that is recognized by the user.

12. The display control apparatus of claim 10, wherein when the distance determined between the display apparatus and the user is less than the predetermined distance, the controller determines the at least one parameter of the stimulus that comprises at least one of a display location of the visual stimulus on a screen of the display apparatus, brightness of the visual stimulus, a form of the visual stimulus, a color of the visual stimulus, a duration of the visual stimulus, and a number of times that the visual stimulus is repeated.

13. The display control apparatus of claim 10, wherein when the distance between the display apparatus and the user is less than the predetermined distance based on the determined parameter, the controller displays at least one selection menu on a screen of the display apparatus, and highlights a selection menu included in the at least one selection menu individually in a random order a predetermined number of times at a predetermined interval.

14. The display control apparatus of claim 13, wherein the controller highlights the selection menu included in the at least one selection menu such that brightness of at least one portion of edges of the at least one selection menu, a display location of the at least one selection menu, or a shape or a color of the at least one selection menu is changed.

15. The display control apparatus of claim 13, wherein the controller selects and executes a selection menu from among the at least one selection menu, based on the EEG signal.

16. The display control apparatus of claim 10, wherein the controller turns off the display apparatus when the user is determined to be asleep based on the EEG signal.

17. The display control apparatus of claim 10, wherein the controller detects at least one of a mental state of the user and an eye movement of the user by using the EEG signal obtained from the user; and displays at least one selection menu on a screen of the display apparatus, based on at least one of the mental state of the user and the eye movement of the user which are detected.

18. The display control apparatus of claim 10, wherein the controller presents the visual stimulus related to at least one selection menu that is displayed on the display apparatus, and wherein the controller determines, from among the at least one selection menu, a selection menu to which the user has reacted, by using a plurality of algorithms, and selects and executes the selection menu from among the at least one selection menu based on a determined result.

19. A non-transitory computer-readable recording medium having recorded thereon a program, which, when executed by a computer, performs a method controlling a display apparatus, the method comprising:

determining whether a distance between the display apparatus and a user is less than a predetermined distance to determine a type of a stimulus to be presented to a user;

determining at least one parameter of the stimulus based on information regarding an environment of the user, the information regarding the environment of the user including at least one of a distance determined between the display apparatus and the user, brightness around the display apparatus, and electroencephalogram (EEG) signal properties of the user;

presenting an auditory stimulus as the type of the stimulus to the user when the distance between the display apparatus and the user is equal to or greater than the predetermined distance based on the determined parameter;

presenting a visual stimulus to the user as the stimulus when the distance between the display apparatus and the user is less than the predetermined distance based on the determined parameter;

obtaining, from the user, an EEG signal in response to the stimulus; and controlling the display apparatus based on the EEG signal.

* * * * *